Aug. 19, 1952 J. W. HESSION, JR 2,607,574
AEROSOL GENERATOR
Filed Feb. 26, 1947 5 Sheets-Sheet 1

Fig. 1

INVENTOR
John W. Hession, Jr.
BY
Austin Wilhelm & Cables
ATTORNEYS

Aug. 19, 1952     J. W. HESSION, JR     2,607,574
AEROSOL GENERATOR Filed Feb. 26, 1947                                  5 Sheets-Sheet 2

INVENTOR
John W. Hession, Jr.
BY
Austin Wilhelm . Carlson
ATTORNEYS

Aug. 19, 1952  J. W. HESSION, JR  2,607,574
AEROSOL GENERATOR

Filed Feb. 26, 1947  5 Sheets-Sheet 3

INVENTOR
John W. Hession, Jr.
BY
Austin Wilhelm & Carlson
ATTORNEYS

Aug. 19, 1952  J. W. HESSION, JR  2,607,574
AEROSOL GENERATOR

Filed Feb. 26, 1947  5 Sheets-Sheet 5

INVENTOR
John W. Hession, Jr.
BY
Austin Wilhelm & Carlson
ATTORNEYS

Patented Aug. 19, 1952

2,607,574

UNITED STATES PATENT OFFICE 2,607,574

AEROSOL GENERATOR

John W. Hession, Jr., Darien, Conn.

Application February 26, 1947, Serial No. 731,128

9 Claims. (Cl. 261—90)

This invention relates to aerosol generators and more particularly to a machine designed to effect a dispersion or diffusion of a selected liquid into particles which are extremely minute and substantially homogeneous in size and adapted to be readily air-borne for substantial distances. This application has certain features in common with my copending application Serial Number 654,610, filed March 16, 1946.

The term "aerosol" is generally accepted in scientific circles as a generic term to describe the size of particles which may be air-borne in varying degrees. Air-borne or aerosol particles may vary in size from one-tenth (.1) micron diameter or less, to upwards of fifty (50) microns diameter. The extent to which an aerosol particle may be air-borne varies with its size or mass. As a rough approximation, it may be said that the cubic mass of a particle is approximately the cube of its diameter, and accordingly a particle which is one hundred (100) microns in diameter would possess approximately one thousand times the cubic mass of a particle of ten (10) microns diameter.

The drift of fine particles in normal air currents is largely determined by the size of the particle, or more particularly, its cubic mass. According to Stokes law of falling particles, it has been determined that in a medium of still air, a particle of six microns in diameter will require approximately five minutes to fall one foot or thirty centimeters; a particle of ten microns diameter will require approximately two minutes to fall thirty centimeters; a particle of twenty microns diameter will require approximately one-half minute to fall thirty centimeters; while a particle of sixty microns diameter will require approximately three seconds to fall thirty centimeters. Aerosol particles which are fifty microns and larger in diameter normally remain suspended in air for a relatively short time period, will drift comparatively very short distances only, and may be aptly classified as sprays. Therefore it may be said that a true aerosol has generally been considered as descriptive of particles which will be borne by normal air currents, and less than fifty microns diameter.

These scientific considerations are guiding factors in effecting diffusion of liquid insecticides, germicides, deodorants, fungicides, sterilizing agents, hormones and medicaments of the greatest importance to agriculture, industry and public health. The particle size of the diffused liquid in many instances determines the effectiveness of the liquid treatment, the quantity or volume of liquid necessary to effect the treatment, the area over which the dispersed liquid is effective, the uniformity of deposition and concentration, the cost of effecting the dispersion and the avoidance of concentrations to a degree which are harmful or objectionable.

In the field of entomology, for example, highly valuable insecticides have been developed whose effectiveness and applicability are to a large extent controlled and determined by particle size considerations. Localized concentrations of some insecticides as obtained by sprays generating particles of fifty (50) microns diameter and greater, may cause damage to useful life forms, such as bees and pollinating insects.

Entomologists have therefore appreciated the essential importance of effecting liquid insecticide dispersions in extremely fine particle size, wherein the required small quantity of effective insecticide is uniformly dispersed over the treated area, and in concentrations and particle size wherein the enemy insect is effectively destroyed, without damaging effects on useful insects and other useful life. Such effective light treatments can be practically obtained by aerosol dispersions wherein the particle size of the treating material ranges in the approximate mean average of eight to twenty microns in diameter, with an optional or mean average of eight to ten microns in diameter in the case of certain insect pests, while other hardier insect pests may require dispersions having particle size ranges in the approximate mean average of sixteen to twenty microns.

Aerosol dispersions having extremely fine and substantially homogeneous particle size have further extensive uses in fumigating, sterilizing, deodorizing, medication, and scenting and conditioning room and building interiors. Aerosol treatment of rooms and interiors is markedly effective where the particle size is properly controlled and reasonably homogeneous, since the liquid aerosol dispersion will drift and uniformly disperse through the atmosphere of the confined space, moving into all the spaces and crevices where air currents may enter and finally be uniformly deposited above and beneath projecting surfaces which, when properly controlled, leaves no visible or objectionable deposit. The air in rooms and interiors can thus be sterilized, fumigated, deodorized, scented and tempered by use of controlled amounts of the liquid material containing the chemical ingredients desirable for the purpose. Building interiors and livestock may also be treated with liquid insecticides to destroy flies and other insects by proper aerosol treatment in controlled concentrations for either present or residual effects. Germicides, medicaments and hormones can also be effectively dispersed with highly successful effects in the treatment and medication of both plant and animal life. The effectiveness and desirability of a particular aerosol treatment is governed by the uniformity of the dispersion in proper and allowable amounts, depending in turn on the propagation of aerosol particles of controlled and substantially homogeneous size.

Monumental efforts have been devoted to the development and invention of aerosol generators which will generate a liquid aerosol dispersion of controlled and substantially uniform particle size. Various machines and devices have been developed and tested, including spray nozzles through which the liquid material is ejected under high pressures, machines utilizing combustion gases and superheated steam, and aerosol bombs. Prior art machines and devices heretofore developed have either failed to produce aerosols having the particle size uniformity which proper treatment conditions require, or which create fire or health hazards, or which require the dispersion of the liquid material in gases which are so highly heated as to damage the effectiveness and usefulness of the treating liquid, or which are cumbersome, expensive, difficult to control and operate, or which require expensive propelling agents and adulterants.

In accordance with this invention, an aerosol generator is provided which is simple in design and construction, economical to manufacture, substantially foolproof in operation and which propagates an aerosol whose particle size may be adjusted and regulated, with the particles having an extremely high degree of size uniformity.

An important feature of this invention is the provision of an improved dispensing head comprising a series of stacked dispensing discs of almost any desired number which are preferably made of wear-resistant metal and preferably present substantially smooth facing surfaces. Spacing elements are provided to space the inner peripheries of the dispensing discs in a manner to present thin open seams for the admission of the aerosol liquid therebetween. The peripheral facing portions of the dispensing discs are preferably in substantially face-to-face contact and so held by compression members which form a part of the dispensing head assembly. A distributor member of unique design is positioned centrally of the dispensing head and adjacent to the inner peripheries of the stacked dispensing discs which operates to distribute the aerosol liquid supplied to the distributor member substantially evenly and uniformly into the open seams defined between the inner peripheral edges of the dispensing discs. The aerosol liquid thus injected between the adjacent surfaces of the dispensing discs, is sheeted and filmed therebetween as the film layers move outwardly to the disc peripheries under the impelling influence of the high speed rotation of the dispensing head. The material is discharged from the disc peripheries in fine aerosol particles possessing remarkable size uniformity.

The surface forming members may be fixed to a common shaft rotated at high speed by any suitable power unit or driving device such as an electric motor, gas or steam turbine, or combustion engine. The aerosol liquid may be supplied to the distributor member by any suitable liquid feed tube, and may be advantageously conducted through the hollow drive shaft. The rotating dispensing discs develop a vacuum area therebetween which serves to draw the liquid aerosol material through the feed tube and into the seams defined between the inner peripheries of the dispensing discs. Means are provided to control the flow of the liquid aerosol material through the feed tube and into the spaced rotating surfaces. With a given diametric size of rotating surfaces, rotating at a given speed, the particle size of the aerosol produced can be nicely regulated by the simple expedient of controlling the amount of flow of the liquid to the dispensing discs. The particle size of the propagated aerosol may also be varied by varying the diametric size of the dispensing discs, or by varying the speed of rotation, or both.

An object of this invention is to provide an aerosol generator designed to produce and generate an aerosol having particle size of substantial homogeniety.

Another object of this invention is to provide an aerosol generator having an improved dispensing head which may be made to deliver almost any desired volume of aerosol output, and by means of which the particle size of the propagated aerosol may be nicely predetermined and controlled.

Another object of this invention is to provide an improved dispensing head of high output capacity by means of which the particle size of the propagated aerosol may be predetermined and controlled.

Another object of this invention is to provide an aerosol generator having an improved blower assembly of high air volume output and low power consumption in cooperative combination with the dispensing head, the working parts of the driving motor being fully enclosed and protected.

Another object of this invention is to provide an aerosol generator having an improved aerosol liquid supply assembly connected in leak-proof relation to the dispensing head, the liquid supply assembly having a detachable supply tank associated therewith.

A further object of this invention is to provide an aerosol generator which is simple and compact in design and construction, which may be constructed in various sizes and forms best suited for the particular aerosol treatment for which the generator is to be used, which may be powered and driven by almost any desired power unit, and which is highly practical in use, economical to manufacture, and flexibly adapted to the various purposes of aerosol propagation.

Other objects and advantages of this invention will become apparent as this description proceeds.

Although the characteristic features of the invention will be particularly pointed out in the claims appended hereto, the invention itself, and the manner in which it may be carried out, may be better understood by referring to the following description taken in connection with the accompanying drawings forming a part hereof, in which

Similar reference characters refer to similar parts throughout the several views of the drawings and specification.

Referring to the drawings, this improved aerosol generator may be said to comprise an outer casing assembly 1 having an upper section 2 which houses and contains the motor assembly 10 and the fan assembly 20. A dispensing head assembly 30 is positioned adjacent to the open end of the upper section 2 of the casing assembly 1 and is fixed to the hollow motor shaft 12. The lower section 3 of the casing assembly 1 contains and houses the aerosol liquid supply assembly 60.

Figure 4:
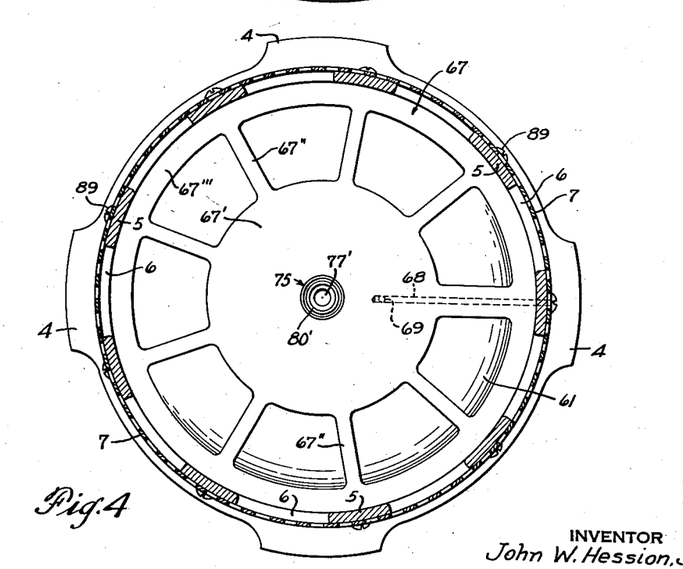
Fig. 4 is a transverse cross-sectional view of the aerosol generator as the same would appear when viewed along line 4—4 of Fig. 1.
Figure 11:
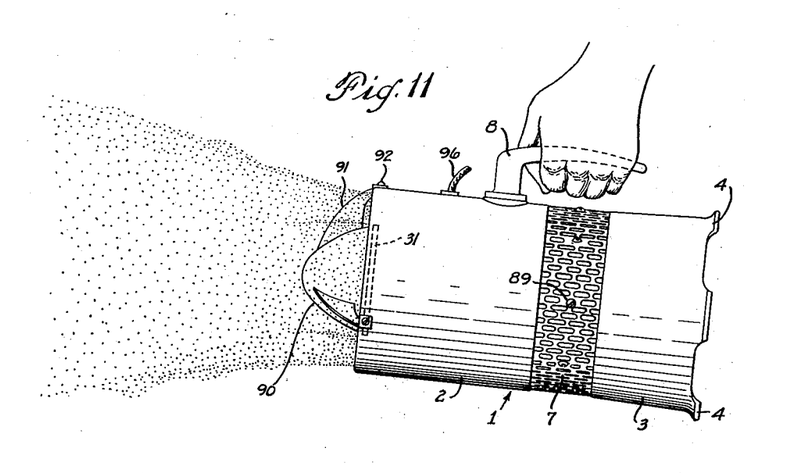
Fig. 11 is an elevational view of the aerosol generator illustrating the manner in which it may be carried when in use.

It will be appreciated that the casing assembly 1 may be made of almost any desired shape and size best adapted for the convenience of the user and the work to be performed. In the construction illustrated in Figs. 1, 4 and 11, the mid-section of the casing 1 is provided with spaced web sections 5 which define spaced openings 6 therebetween through which air may be freely drawn into the interior of the casing assembly 1. The web sections 5 and the spaced air openings 6 are encircled by a protective grille 7 to protect the interior mechanism, the upper and lower edges of the grille 7 seating against spaced shoulders 7' formed in the casing wall to maintain the grille band in position substantially flush with the exterior surface of the casing 1. The generator may be supported upon suitable flared feet 4 associated with the lower end of the casing section 3. A manipulating handle 8 attached to the casing 1 may be provided so that the aerosol generator may be carried substantially in the position shown in Fig. 11 while in use. If desired, the upper end of the generator may also be provided with a bale strap 9, preferably formed of metal, attached to the upper casing section 2 to facilitate transportation of the unit.

This generator unit is preferably designed to be driven by a high speed motor 11 fixed to a hollow shaft 12 and housed within a tubular motor casing 13. The upper end of the tubular casing 13 may be closed by a cover plate 14 secured in position as by suitable screws 14', as shown more particularly in Figs. 1 and 2. The lower end of the tubular motor casing 13 may be closed by a suitable closure as presented by a bulged portion of the motor casing 13, the bulged portion terminating in a collar 13'. The lower end of the motor casing 13 may also be closed by the upper end of the fan casing 21 which will presently be described. The enclosed motor casing prevents the collection of dust and aerosol material on the operating parts of the motor and the associated motor bearings, thereby insuring long life to the unit.

The rotatable motor shaft 12, having a tubular passage 12' therein through which the aerosol liquid is conducted from the source of supply to the dispensing head 30, is rotatably mounted in a pair of bearing assemblies 15. Each bearing assembly is preferably of the ball bearing type having a bearing ring 16 fixed to the motor shaft 12 to rotate therewith, and a stationary bearing ring 16'. One of the bearing rings 16' is fixed to a surrounding collar 17 associated with the cover plate 14 of the motor casing. Suitable radially extending webs 17' associated with the casing cover plate 14 may be provided to brace the collar portion 17 and further strengthen and stiffen the construction. The rotatable bearing ring 16 and the stationary bearing ring 16' provide a raceway for the contained ball bearings 18. The ball bearings 18 may be additionally housed between bearing seals 18' to retain the bearing lubricant therebetween and insure long bearing life. The other bearing assembly 15 is supported by the collar 13' at the lower end of the motor casing.

Figure 1:
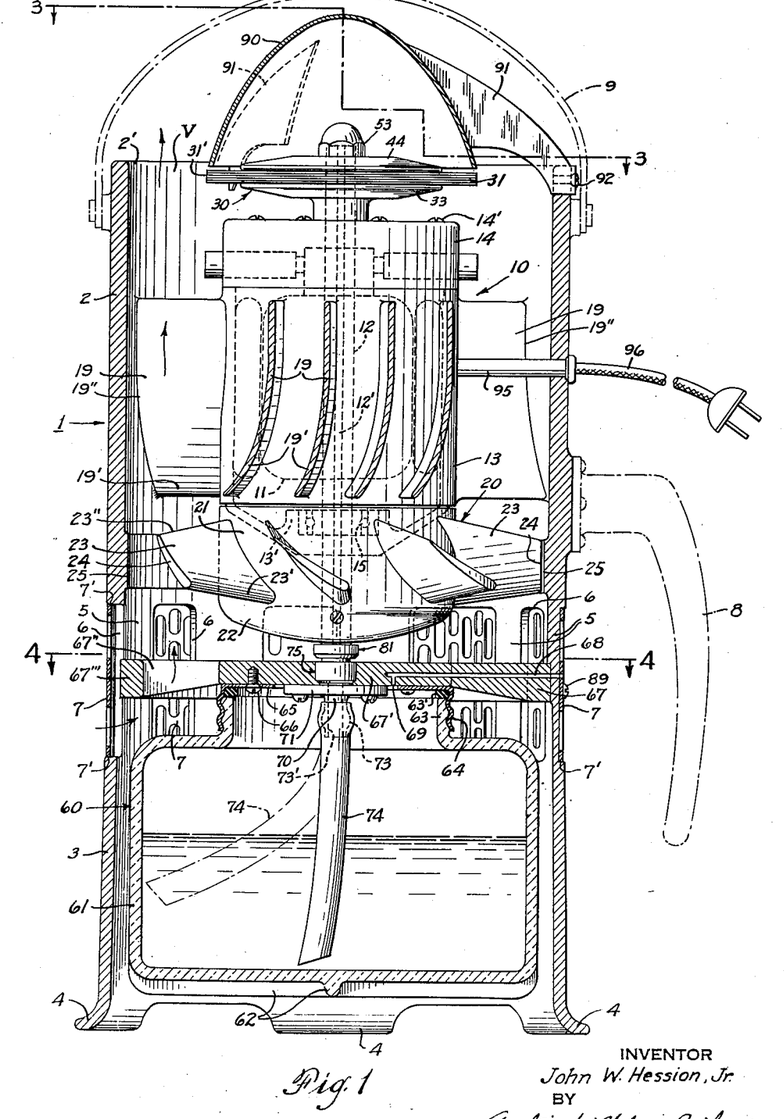
Fig. 1 is an elevational view of the improved generator, certain parts thereof being shown in section.

The blower fan assembly 20 is fixed to rotate with the hollow motor shaft 12 directly below the tubular motor casing 13. The blower assembly may comprise a tubular body portion 21 having the same diameter as the tubular motor casing 13, and may be provided with a closed end wall 22 cast integrally with the tubular body portion 21. The closure end wall 22 of the blower casing may be fixed directly to the motor shaft 12 and sealed thereto so that no dust or aerosol liquid can enter into the tubular casing 21 of the fan or the tubular casing 13 of the motor. Radially extending, scoop-shaped fan blades 23 may be integrally attached to the tubular body 21 of the fan assembly as shown in Fig. 1. The fan blades receive air entering the casing assembly 1 through the air openings 6 and serve to drive the air axially at considerable velocity. The inner ends of the scoop shaped fan blades 23 extend across the vertical wall and the fan casing 21 at an angle roughly approximating 30°. The lower edge 23' of the fan blades may be of rounded curvature with the fan blades tapering towards the upper edge 23'' thereof to a relatively thin edge. The outer ends 24 of the fan blade are square cut so as to substantially conform to the interior wall portion 25 of the outer casing assembly 1 with a minimum of clearance therebetween.

The tubular motor casing 13 is provided with radially extending fins 19 having curved lower end portions 19' as shown in Fig. 1. The outer vertical edges 19'' of the fins 19 may be cast integral with the inside face of the upper section 2 of the casing assembly 1. The fins 19 serve as straightener vanes for the air blast generated by the fan assembly 20, and serve to direct the air stream axially so that an axial flow of the air is achieved as it emerges from the upper rim 2' of the casing assembly 1. The air stream travelling between the fins 19 serves to keep the tubular motor casing 13 cool, thus dissipating heat generated by the driving motor 11. It will be appreciated that the fan assembly 20 rotates with the motor shaft 12 at the same speed as the motor, while the motor casing 13 and the associated motor casing fins 19 remain stationary, with the motor armature contained in the motor casing 13 free to revolve therein.

An important feature of this invention is the provision of an improved dispensing head assembly which is shown in detail in Fig. 2 and Figs. 6 to 9 inclusive. The dispensing head assembly comprises essentially a series of stacked discs 31 of almost any desired number which are made from hard wear-resistant metal presenting smooth and polished surfaces. The dispensing discs 31 as formed may be substantially flat, and preferably present a truly circular outer periphery 31' and a circular inner periphery 31'' as shown more particularly in Figs. 5 and 7. The discs are stacked together, with means provided to maintain their inner peripheries separated a few thousandths of an inch to admit the aerosol liquid therebetween, the outer facing portions of the dispensing discs being substantially in face-to-face lapped contact and so held when stationary by compression members which form a part of the dispensing head assembly.

The stacked dispensing discs are supported upon a distributor member 33 having a hub portion 34 provided with a bore 34' which snugly telescopes over the upper end of the hollow motor shaft 12 and is suitably splined or otherwise secured to the motor shaft 12 to rotate therewith. The upper face of the distributor member 33 is provided with a circular cavity 35 defined by a splash wall 37 of generally circular contour. The motor shaft 12 is provided with two or more liquid discharge openings 38 which extend radially through the tubular wall thereof. The bores or holes 38 provide communicating passages for the aerosol liquid flowing through the tubular passage 12' of the shaft to the recess cavity 35. During the high speed rotation of the dispensing head assembly, the aerosol liquid is centrifugally thrown from the recess 35 over the splash wall 37 and into a surrounding cavity 55 whose outer periphery is defined by an abutment wall 39. The abutment wall 39 is separated into spaced segments by radially extending narrow slits 40 through which the aerosol liquid may escape. The slit passages 40 are sufficiently narrow so that the liquid reaching the well 55 is centrifugally ejected from the entire length of the slits 40.

The inner periphery 31'' of the dispensing discs 31 snugly abuts against the outer periphery of the abutment wall 39. The lowermost disc, as shown more particularly in Fig. 2, seats against a sealing ring 41 housed within a conforming cavity 41' formed in the flange portion 42 of the distributor member 33. The flange portion 42 is provided with a peripheral bead 43 against which the lowermost disc 31 also seats.

The stacked dispensing discs 31 are clamped between the flange portion 42 of the distributor member 33 and a dish-shaped compression member 44 which has a central hole through which the upper end of the motor shaft 12 snugly telescopes. The lower face of the compression member 44 is provided with a shallow circular recess 45 designed to snugly receive the upper end of the abutment wall 39. A sealing gasket 46 seating within a conforming cavity 46' in the compression member 44 is designed to press against the inner edge portion of the top dispensing disc 31, the compression member 44 also having a flange portion 47 provided with a bead 48 shaped to exert pressure against the topmost dispensing disc, approximately at the mid-section thereof.

It will be appreciated that when the dispensing head is fully assembled, the bead portions 43 and 48 of the compression members 33 and 44 serve to press the outer peripheral portions of the dispensing discs into substantial face-to-face contact so that the outer periphery 31' of the dispensing discs present an almost imperceptible seam therebetween. The sealing rings 41 and 46 may be made of rubber or like composition to provide a leak-proof seal which prevents the escape of aerosol liquid between the compression members 33 and 44 and the adjacent dispensing discs. A cap nut 53 having an internal thread 54 is screwed to the upper end of the hollow shaft and may be tightened to exert pressure against the compression member 44 so that the stacked dispensing discs 31 are clamped between the bead formations 43 and 48 of the compression members 33 and 44 so that the peripheral facing portions of the discs are compressed together in substantially face-to-face contact.

Figures 5, 6:
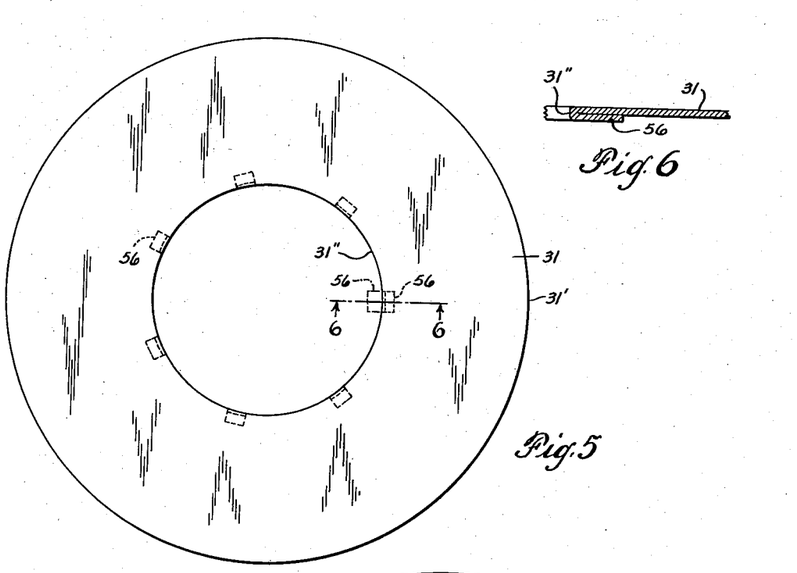
Fig. 5 is a plan view of one of the dispensing discs.
Fig. 6 is a fragmentary cross-sectional view of a portion of the dispensing disc as the same would appear when viewed along line 6—6 of Fig. 5.
Figures 7, 8, 9:
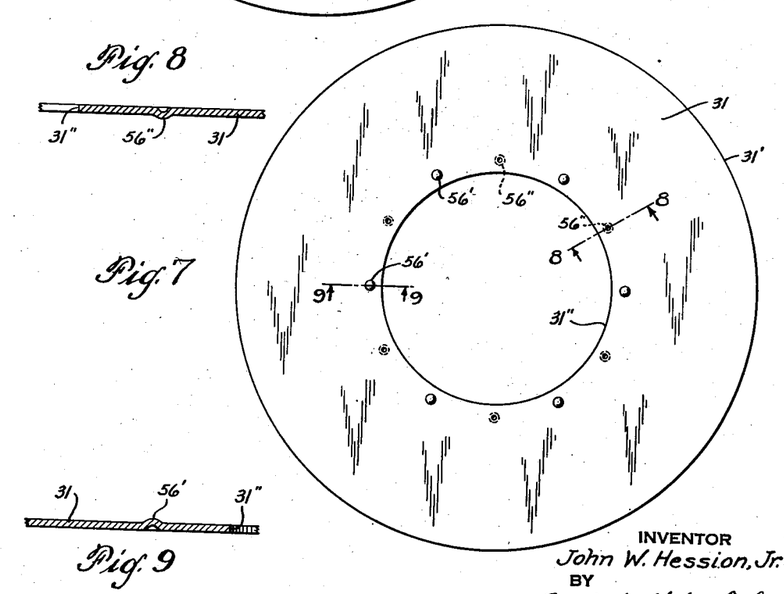
Fig. 7 is a plan view of one of the dispensing discs of somewhat modified construction and having spaced pimples around the inner periphery to provide for spacing of the inner peripheries of the assembled dispensing discs.
Fig. 8 is an enlarged fragmentary cross-sectional view of the modified dispensing disc as the same would appear when viewed along line 8—8 of Fig. 7.
Fig. 9 is an enlarged fragmentary cross-sectional view of the modified dispensing disc as the same would appear when viewed along line 9—9 of Fig. 7.
Figure 10:
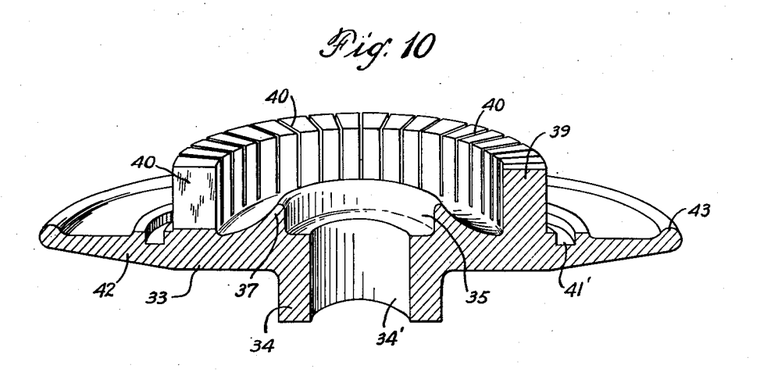
Fig. 10 is a perspective view, partially in cross section, of the hub member which forms a part of the dispensing head.

The inner peripheral edges 31'' of the dispensing discs are maintained in spaced apart relationship by suitable spacer elements. As shown in Figs. 5 and 6, the spacer elements may comprise thin rebent tongues 56 cut from the sheet metal from which the disc is formed, each tongue 56 being rebent to overlie the adjacent face of the disc so that when the discs are stacked together in operating relationship, the inner peripheral edges 31'' of the discs are maintained spaced apart a few thousandths of an inch. As another modification, the spacer elements may comprise minute pimples 56' and 56'' which are stamped out along the inner peripheral edge of alternate discs as shown in Figs. 7, 8 and 9. It will be noted that the spaced pimples 56' project slightly from one side face of the disc, and the alternate pimples 56'' project slightly from the opposite side of the disc. Where the spacing elements project alternately from opposite sides of the disc, only alternate discs need be equipped with spacer elements.

An aerosol liquid supply assembly 60 is contained within the lower section 3 of the casing assembly 1 and has a feeding connection with the lower end of the hollow shaft 12. The aerosol liquid may be contained within a container 61 made of either glass or metal, the jar 61 having a threaded neck portion 63 adapted to be screwed into the threaded flange 64 of a closure cap. Cross ribs 62 may be associated with the bottom wall of the container 61 to facilitate attachment and detachment thereof to the closure cap. The closure cap is provided with a top wall 65 which is secured as by screws 66 to a spider frame 67 which is fixed to the web portions 5 of the casing assembly 1 as by screws 89. A gasket ring 63' of rubber or like material may be fixed within the closure cap to provide a leak-proof seal between the neck portion 63 of the container and the closure cap.

The spider frame 67 presents a substantially solid center section 67' connected by webs 67'' to the rim portion 67''' thereof. The openings defined by the webs 67'' provide passages through which air is drawn by the fan blades 23. The spider frame 67 is provided with an air bleeder passage 68 extending radially inwardly thereof and connecting to an axial extending bleeder passage 69 through which air may enter in limited amounts to the aerosol liquid container 61. The bleeder passages 68 and 69 are sufficiently small in diameter so that no aerosol liquid in any appreciable quantity could escape therethrough.

Figure 2:
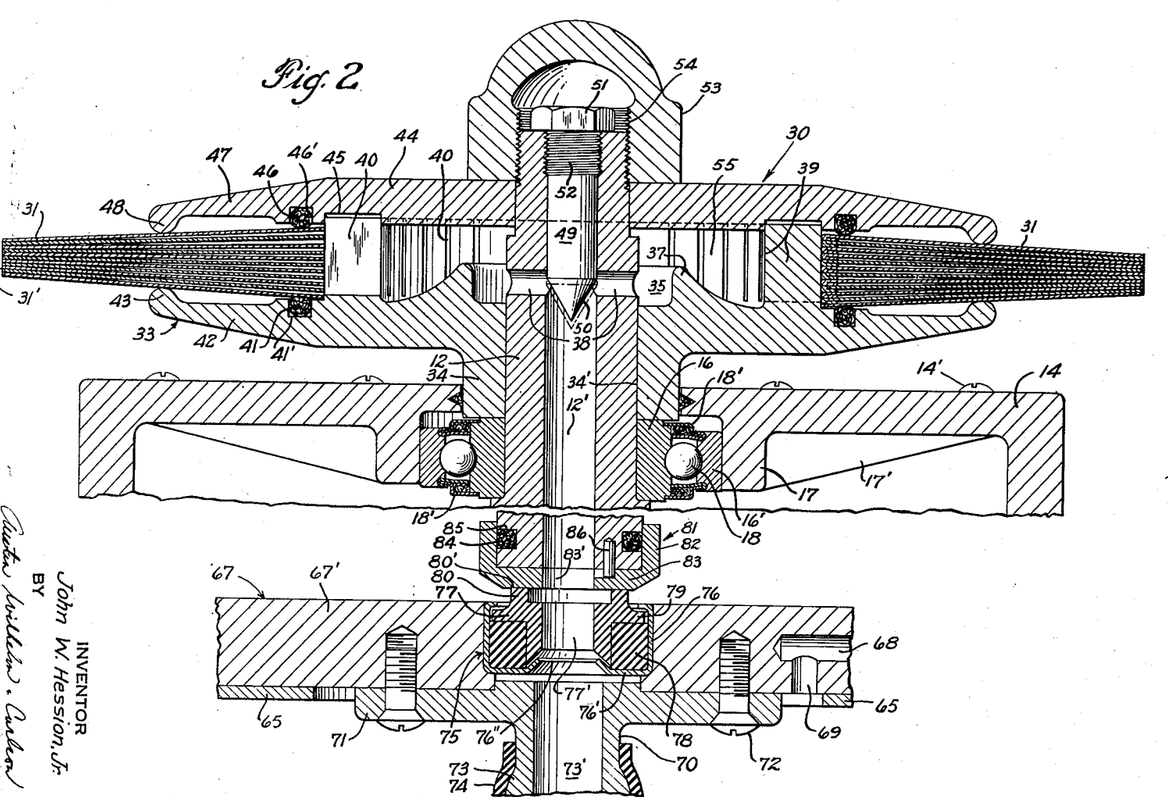
Fig. 2 is an enlarged cross-sectional view of the dispensing head, this view also showing the upper portion of the hollow drive shaft and associated motor enclosing casing, and in addition, a fragmentary portion of the aerosol liquid supply conduit and the liquid seal for connecting the normally stationary supply conduit to the rotatable hollow drive shaft.
Figure 3:
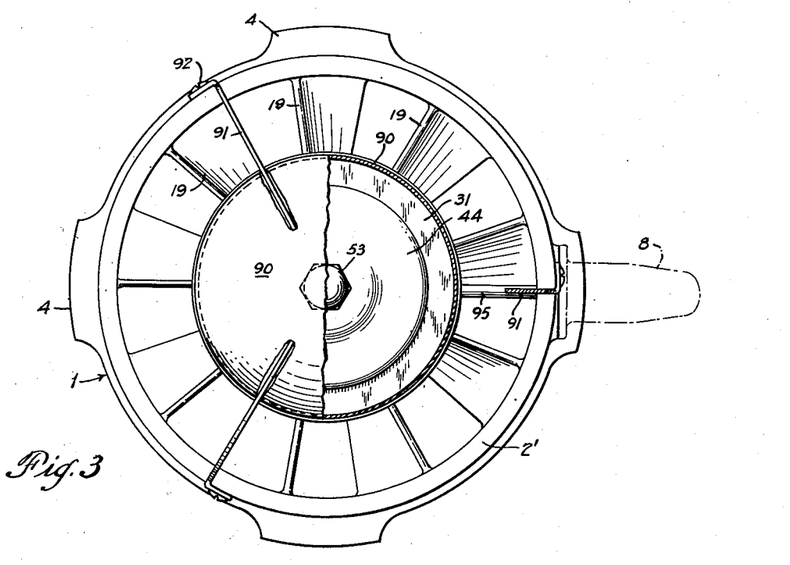
Fig. 3 is a transverse cross-sectional view of the upper portion of the aerosol generator as the same would appear when viewed along line 3—3 of Fig. 1.

As shown more particularly in Figs. 1 and 2, the aerosol liquid within the container 61 is removed through a feed tube 74 which may be made of rubber, metal or the like. The upper end of the feed tube 74 may be telescoped over the bulged collar 73 of a fitting 70 which has a laterally extending flange 71 associated therewith secured to the center section 67' of the spider frame 67 as by screws 72. The fitting 20 has a liquid passage 73' extending therethrough.

A sealing assembly is provided which makes a leak-proof connection between the outlet end of the fixed fitting 70 and the rotatable tubular shaft 12. The sealing assembly comprises a stationary part 75 which comprises a cup-shaped member 76 having an inturned bottom wall 76' which is snugly fitted and sealed within a cavity provided in the center section 67' of the spider frame 67. A bearing ring 77 formed from a carbon or other nonmetallic composition seats within the cup-shaped member 76 and is supported by a resilient cushion ring 78 snugly seated within the cup-shaped member 76. An axially extending liquid passage 77' is provided in the bearing ring 77 which communicates with a like opening 76" in the bottom wall 76' of the cup member 76. The bearing ring 77 has an overhanging flange portion 79 which seats on the cushion ring 78 and an upstanding boss portion 80 which has a polished bearing surface 80'.

A companion sealing part 81 is fixed to rotate with the tubular shaft 12 and comprises a cup member having a tubular wall 82 which embraces the lower end of the shaft 12 and a bottom wall 83 which seats against the lower end of the shaft, the bottom wall 83 having an axial opening 83' therein which is in alignment with the passage 12' of shaft 12 and the passage 77' of bearing member 77. A gasket ring 84 seats within a conforming groove 85 extending circumferentially around the lower end of the shaft 12. The ring 84 provides a leak-proof seal between the shaft 12 of the side wall 82 of the cap member. An aligning pin 86 may be provided to secure the cup member to the end of the tubular shaft 12. The lower face of the bottom wall 83 of the cup member, which rotates with the shaft 12, has a smooth bearing fit against the bearing face 80' of the bearing member 77. This bearing contact is maintained by the resilient cushion 78 supported by the spider frame 67. It will be appreciated that the cup member associated with the shaft 12 rotates while the bearing ring 77 fixed within the spider frame 67 remains stationary. The contact surface 80' of bearing member 77 is maintained in bearing position against the rotating bearing wall 83 associated with the rotating shaft 12 in a manner to provide a leak-proof seal therebetween, and the small amount of wear which the bearing surface 80' receives is compensated for by the resiliency of the compressed supporting cushion 78.

In operation, current is supplied to the motor which in turn rotates the shaft 12 to which the dispensing head assembly 30 is attached. As the dispensing head rotates, air contained within the cavities 35 and 55 of the dispensing head is ejected and escapes between the closely fitted dispensing discs 31, thus creating a substantial vacuum or suction in the head spaces 35 and 55. The vacuum thus created draws the aerosol liquid from the container 61 through the tubing 74 which extends into the liquid, thence through the passage 77' in the stationary part 75 and through the passage 83' of the rotating part 81 of the sealing ring assembly. The aerosol liquid, under the suction action created by the rotating dispensing head, flows rapidly through the passage 12' in the tubular motor shaft 12 and escapes through the axial passages 38 in the shaft 12 and into the well 35 of the dispensing head. The centrifugal force generated by the rotation of the dispensing head 30 throws the aerosol liquid over the crest of the spillway wall 37 against the entire inner surface of the abutment wall 39.

The increasing centrifugal force drives the aerosol liquid through the entire length of the numerous slit passages 49 in the abutment wall 39, between the dispensing discs at the spaced inner edges 31'" thereof, and outwardly within the contracting spaces between the dispensing discs 31. As the aerosol liquid continues to travel outwardly between the closely fitted surfaces of the dispensing discs 31, the liquid is sheeted into a series of films of minute thickness and emerges in a series of layers of aerosol particles substantially homogeneous in size.

The aerosol particles centrifugally discharged from the outer periphery 31' of the dispensing discs 31 will be picked up by the air stream generated by the blower 20 as the air travels through the opening $v$ defined between the upper edge 2' of the casing 1 and the periphery of the stacked discs. The air stream travelling through the throat opening $v$ changes the direction of movement of the aerosol particles, initially moving in the general plane of the dispensing discs, to a direction generally normal to the plane of the dispensing discs. Where a large number of stacked dispensing discs are employed having a high volume output, the throat space $v$ should accordingly be increased and the air volume impelled by the blower 20 should be likewise increased. It has been found that the size controlled aerosol particles propagated by this improved dispensing head are substantially homogeneous in size, and do not agglomerate or combine into larger particles, even though twenty or more stacked dispensing discs are used to propagate nineteen or more streams of aerosol particles discharging from the disc peripheries.

The stacked dispersion discs should present their adjacent peripheral face portions in substantially surface-to-surface contact if an aerosol of relatively small particles of uniform size are to be expected. The dispersion discs 31, while made of strong and tough metal, may be made substantially thin so that the peripheral portions thereof are held in resilient face-to-face contact by the bead portions 43 and 48.

The dispensing discs are preferably, but not essentially, circular in form, and may vary from two to three inches in diameter to twenty or more inches in diameter. The dispersion discs should be mounted to rotate at relatively high speed to effect a peripheral velocity of from approximately fifty feet per second to several hundred feet per second and upwards, depending upon the aerosol liquid used, the particle size to be produced, and the volume rate at which the aerosol liquid is fed to the dispensing head.

The size of the aerosol particles may be controlled by controlling the volume of aerosol liquid admitted to the dispensing discs. It will be appreciated that an increased volume of aerosol liquid supplied to the dispensing head will exert a corresponding greater pressure against the adjacent disc surfaces as the liquid films move outwardly. The increased pressure may be such as to cause a slight separation of the adjacent peripheral surfaces of the dispensing discs, which will result in the propagation of an aerosol of a larger particle size. The volume of aerosol liquid admitted to the dispensing discs may be conveniently controlled by the provision of an adjusting screw 49 which fits into the end of the tubular feed shaft 12, the adjusting screw 49 having a tapered end portion 50, a threaded neck portion 52 and a head portion 51 by means of which the lower tapered portion 50 of the screw may be manipulated to control the volume of aerosol liquid permitted to discharge into the radial tube passages 38. A plurality of adjusting screws 49 having tapered ends 50 of varying shape may be provided for each aerosol generator unit so that selected adjusting screws may be interchangeably applied to the tubular feed shaft 12 to provide a variety of known and predetermined discharge settings for the unit.

A dome-shaped protective guard 90 may be positioned directly over the dispensing head 1 as shown in Fig. 1 to prevent inadvertent contact with the spinning dispensing head and also to blank out any undesirable eddy currents. The dome-shaped guard member 90 may be supported by flared arms 91 attached to the upper end of the casing 1 as by removable screw 92. The supporting arms 91 are preferably made of relatively thin metal with their flat surfaces lying in an axial plane so as to not appreciably interfere with the movement of the aerosol discharged from the unit. Where an electric motor provides the power source, a power conduit 95 may be provided which extends through the casing 1 and motor casing 13 and receives the power cable 96. A suitable switch connection may be provided adjacent the casing 1 for the convenient control of the current flow to the motor.

Aerosol generators may be made in accordance with this invention to produce aerosols of any selected particle size ranging from one to two microns in diameter up to the upper ranges of aerosol particle sizes, and the selected size of the aerosol particles may be maintained substantially uniform. Where aerosols having particle size of only a few microns is desired, the adjacent peripheral faces of the dispersion discs 31 should be polished and closely lapped so as to present smooth surfaces in face-to-face contact, and the volume of aerosol liquid fed between the discs should be controlled so that the pressure exerted by the liquid moving outwardly between the adjacent faces of the discs will not appreciably separate the closely contacting surfaces of the dispensing discs.

By increasing the liquid flow to the dispensing discs, a corresponding increased separating pressure may be exerted against the adjacent surfaces of the dispensing discs to thereby increase the size of the aerosol particles produced. Aerosol generators may be made in accordance with this invention having any desired aerosol output capacity of the selected particle size by increasing or decreasing the diametric size of the discs and/or increasing or decreasing the number of the dispensing discs assembled into the unitary dispensing head.

It will be appreciated that this improved dispensing head may be driven by any selected power unit such as an electric motor, gas or stream turbine, combustion engine, air compressor or the like, and may be made as a small compact unit for interior use or as a high capacity unit for field use. While the blower assembly may be varied in type and design, a blower assembly of the type above generally illustrated and described is particularly economical in power consumption and may be designed to produce a high volume, high velocity air stream which will give substantial direction to the projected aerosol. Aerosol generators constructed in accordance with the teachings of this invention are ideally suited for numerous aerosol treatments in the field of entomology, agronomy, animal husbandry, public health, sanitation and medicine.

It is understood that the principles of this invention may be embodied in various modifications and adaptations, and it will be accordingly appreciated that this invention is not limited to the particular embodiments described and illustrated, and that various omissions, substitutions and changes may be made by those skilled in the art without departing from the teachings of this invention.

What I claim is:

1. A machine for converting liquids to aerosols which includes, a dispensing head comprising a plurality of dispensing discs arranged in stacked relationship, said dispensing discs being substantially of equal exterior diameter and having resilient peripheral portions and presenting a plurality of paired filming surfaces, means for maintaining the adjacent inner surface areas thereof in spaced relationship and urging the adjacent peripheral surface areas thereof in resilient contiguous relationship, a distributor member positioned centrally of said dispensing discs, a tubular shaft fixed to said dispensing discs and distributor member, said tubular shaft having a discharge outlet through which aerosol liquid is supplied to said distributor member, said distributor member having an interior splash wall spaced from the discharge outlet in said shaft over which the shaft discharged liquid may splash, an abutment wall arranged in surrounding spaced relationship from said splash wall, said abutment wall having a plurality of axially extending and radiating slits extending therethrough for distributing the aerosol liquid splashed over said splash wall between the adjacent surfaces of said dispensing discs, and means for rotating said dispensing discs at predetermined speed.

2. A machine for converting liquids to aerosols which includes, a dispensing head having dispersion members having resilient peripheral portions and presenting adjacent filming surfaces, means for maintaining the inner surface areas of said dispersion members in spaced relationship and urging the adjacent peripheral surfaces thereof in resilient contiguous relationship, a drive shaft fixed to said dispensing head, a blower assembly including a tubular casing having the terminal edge thereof terminating adjacent to and spaced substantially directly opposite the periphery of said dispensing head to define a discharge throat therebetween, a driving motor within said outer casing for rotating said shaft, said motor being encased within a motor casing, a blower fan positioned adjacent said motor casing having radiating fan blades, straightener vanes radiating from said motor casing operative to rectify the gaseous stream propelled by said blower fan and to direct the gaseous stream in a generally axial direction through said discharge throat, and means for supplying aerosol liquid to said dispensing head.

3. A machine for converting liquids to aerosols which includes, a dispensing head having dispersion members having resilient peripheral portions and presenting adjacent filming surfaces, means for maintaining the inner surface areas of said dispersion members in spaced relationship and urging the adjacent peripheral surfaces thereof in resilient contiguous relationship; a drive shaft fixed to said dispensing head, a blower assembly including a tubular casing having the terminal end thereof terminating adjacent to and spaced substantially directly opposite the periphery of said dispensing head defining a discharge throat therebetween, a driving motor within said outer casing for rotating said shaft, said motor being encased within a motor casing, a blower fan positioned adjacent said motor casing having a fan casing of the approximate diameter of said motor casing and fan blades radiating from said fan casing, straightener vanes radiating from said motor casing operative to rectify the gaseous stream propelled by said blower fan and to direct the gaseous stream in a generally axial direction through said discharge throat, and means for supplying aerosol liquid to said dispensing head.

4. In a machine for generating and directing a fog stream, a substantially tubular casing having an annular wall terminating in an annular edge, a rotatable head comprising a dispersion member, a hollow shaft supporting said head and communicating with said dispersion member, said head being disposed opposite said annular edge so as to form an annular discharge throat between said edge and the periphery of said head, an electric motor next to said head and comprising a stator housing with a rotor therein, said rotor being mounted on said shaft, a plurality of straightening vanes extending generally lengthwise of said casing from said housing, a blower having an impeller mounted on said shaft adjacent said motor housing on the side opposite said head, a support on the opposite side of said blower from said motor, said support having a seal against which said shaft rotates, a reservoir beyond said seal, a duct connecting said seal and arranged to draw liquid from said reservoir when the machine is in various positions between vertical and horizontal, said casing having an air inlet adjacent said blower, whereby an air stream is drawn in through said inlet by said blower and discharged past through said straightening vanes to said annular discharge throat where it picks up the liquid particles discharged from said head and delivers them directionally, substantially axially of the machine, to free atmosphere as a fog stream.

5. In a machine for generating and directing an aerosol fog stream, a substantially tubular casing having an annular wall terminating in an annular edge, a rotatable head comprising a plurality of dispersion plates having substantially smooth peripheral surfaces, resilient means for urging said dispersion plates together so that their peripheral surfaces are in substantially continuous contact throughout the entire circumference when the head is stationary, the central portions of said plates being spaced apart to form a central space, a hollow shaft supporting said head and communicating with said central space, said head being so disposed opposite said annular edge so as to form an annular discharge throat between said edge and the periphery of said head, an electric motor next to said head and comprising a stator housing with a rotor therein, said rotor being mounted on said shaft, a plurality of straightening vanes extending generally lengthwise of said casing and extending generally radially from said motor housing to said casing wall, a blower having its impeller mounted on said shaft adjacent said motor housing opposite from said head, a support adjacent said blower opposite from said motor, said support having a seal against which said shaft rotates, a reservoir beyond said seal, a duct connecting said seal and arranged to draw liquid from said reservoir when the machine is in various positions between vertical and horizontal, said casing having an air inlet adjacent said blower, whereby an air stream is drawn in through said inlet by said blower and discharged past through said straightening vanes to said annular discharge throat where it picks up the aerosol particles discharged from said head and delivers them directionally, substantially axially of the machine, to free atmosphere as an aerosol fog stream.

6. In a machine for generating and directing a fog stream, a substantially tubular casing having an annular wall terminatnig in an annular edge, a rotatable head comprising a dispersion member, a hollow shaft supporting said head and communicating with said dispersion member, said head being disposed opposite said annular edge so as to form an annular discharge throat between said edge and the periphery of said head, an electric motor next to said head and comprising a stator housing with a rotor therein, said rotor being mounted on said shaft, said stator housing being secured to said tubular casing so as to allow an air passage therebetween, a blower having an impeller mounted on said shaft adjacent said motor housing on the side opposite said head, a support on the opposite side of said blower from said motor, said support having a seal against which said shaft rotates, a reservoir beyond said seal, a duct connecting said seal and arranged to draw liquid from said reservoir when the machine is in various positions between vertical and horizontal, said casing having an air inlet adjacent said blower, whereby an air stream is drawn in through said inlet by said blower and discharged through the space between said stator housing and said tubular casing to said annular discharge throat where it picks up the liquid particles discharged from said head and delivers them directionally, substantially axially of the machine, to free atmosphere as a fog stream.

7. In a machine for generating and directing an aerosol fog stream, a substantially tubular casing having an annular wall terminating in an annular edge, a rotatable head presenting a plurality of dispersion plates having resilient peripheral portions and substantially smooth peripheral surfaces, means for urging the adjacent peripheral surfaces of said dispersion plates in resilient continuous contact throughout the entire circumference when the head is stationary and for maintaining the central portions of said plates in spaced apart relation to form a central space, a hollow shaft supporting said head and communicating with said central space, said head being disposed opposite said annular edge to form an annular discharge throat between said edge and the periphery of said head, an electric motor comprising a stator housing with a rotor therein, said rotor being fixed to said shaft, a blower having its impeller mounted on said shaft, a liquid reservoir, a stationary conduit for drawing liquid from said reservoir when the machine is in various positions between vertical and horizontal, means for hermetically connecting the adjacent ends of said stationary conduit and said tubular shaft, an air inlet adjacent said blower whereby an air stream is drawn in through said inlet by said blower and discharged through said annular discharge throat where it picks up the aerosol particles discharged from said head and delivers them directionally, substantially axially of the machine, to free atmosphere as an aerosol fog stream.

8. In a machine for generating and directing an aerosol fog stream, a substantially tubular casing having an annular wall terminating in an annular edge, a rotatable head comprising a plurality of dispersion discs presenting adjacent liquid filming surfaces, a hollow shaft supporting said head and communicating with said dispersion discs, said head being disposed opposite said annular edge so as to form an annular discharge throat between said edge and the periphery of said head, an electric motor comprising a stator housing with a rotor therein, said rotor being mounted on said shaft, said stator housing being secured to said tubular casing so as to provide an air passage therebetween, a blower having an impeller mounted on said shaft adjacent said stator housing on the side opposite said head, a liquid reservoir, a stationary conduit for drawing liquid from said reservoir when the machine is in various positions between vertical and horizontal, means for hermetically connecting the adjacent ends of said stationary conduit and said tubular shaft, an air inlet adjacent said blower whereby an air stream is drawn in through said inlet by said blower and propelled through the space between said stator housing and said tubular casing and discharged through said annular discharge throat where it picks up the liquid particles discharged from said head and delivers them directionally, substantially axially of the machine, to free atmosphere as an aerosol fog stream.

9. In a machine for generating and directing an aerosol fog stream, a substantially tubular casing having an annular wall terminating in an annular edge, a rotatable head comprising a plurality of superimposed dispersion discs presenting adjacent filming surfaces, a hollow shaft supporting said head and communicating with said dispersion discs, said discs having the peripheries thereof disposed opposite said annular edge so as to form an annular discharge throat between said edge and the periphery of said head, an electric motor comprising a stator housing having a rotor therein, said rotor being mounted on said shaft, a plurality of straightener vanes extending generally radially and lengthwise of said casing and between said casing and stator housing, a blower having an impeller mounted on said shaft, a liquid reservoir, a stationary conduit for drawing liquid from said reservoir when the machine is in various positions between vertical and horizontal, means for hermetically connecting the adjacent ends of said stationary conduit and said tubular shaft, an air inlet adjacent said blower whereby an air stream is drawn in through said inlet by said blower and propelled past said straightener vanes and discharged through said annular discharge throat where it picks up the liquid particles discharged from said head and delivers them directionally, substantially axially of the machine, to free atmosphere as an aerosol fog stream.

JOHN W. HESSION, Jr.

REFERENCES CITED

The following references are of record in the file of this patent:

UNITED STATES PATENTS

| Number | Name | Date |
| --- | --- | --- |
| 409,978 | Kisinger | Aug. 27, 1889 |
| 930,483 | Kershaw | Aug. 10, 1909 |
| 976,350 | Ehrsam et al. | Nov. 22, 1910 |
| 1,242,445 | Ittner | Oct. 9, 1917 |
| 1,420,722 | MacLachlan | June 27, 1922 |
| 1,585,393 | Laughlin | May 18, 1926 |
| 1,719,869 | Boyd | July 9, 1929 |
| 1,735,692 | Nyrop | Nov. 12, 1929 |
| 1,784,853 | Tiffany | Dec. 16, 1930 |
| 1,892,694 | Carter | Jan. 3, 1933 |
| 1,908,230 | Fawkes | May 9, 1933 |
| 1,994,912 | Hochstetter | Mar. 19, 1935 |
| 2,006,627 | Cairncross | July 2, 1935 |
| 2,056,296 | Robertson | Oct. 6, 1936 |
| 2,084,621 | Norris | June 22, 1937 |
| 2,157,416 | Kjos | May 9, 1939 |
| 2,251,457 | Lee | Aug. 5, 1941 |

FOREIGN PATENTS

| Number | Country | Date |
| --- | --- | --- |
| 131,306 | Switzerland | Apr. 16, 1929 |